United States Patent [19]

Koh et al.

[11] 4,241,039
[45] Dec. 23, 1980

[54] METHOD OF REMOVAL OF ARSENIC FROM A SULFURIC ACID SOLUTION

[75] Inventors: Shiro Koh; Tomomichi Kudo; Michihiro Maeshima; Tamotsu Kibayashi, all of Okayama, Japan

[73] Assignee: Dowa Mining Co. Ltd., Tokyo, Japan

[21] Appl. No.: 967,872

[22] Filed: Dec. 8, 1978

[30] Foreign Application Priority Data

Dec. 14, 1977 [JP] Japan .............................. 52/150175

[51] Int. Cl.³ ...................... C01B 17/90; C01G 28/02
[52] U.S. Cl. ....................................... 423/531; 423/87; 423/601
[58] Field of Search ................. 423/87, 522, 531, 601, 423/602

[56] References Cited

U.S. PATENT DOCUMENTS

| 2,686,114 | 8/1954 | McGauley et al. .................. 423/602 |
| 2,835,569 | 5/1958 | Reynaud .................................. 75/114 |
| 2,959,467 | 5/1960 | Yusuf ...................................... 423/87 |
| 3,107,977 | 10/1963 | Borvali et al. ....................... 423/87 |
| 3,684,492 | 8/1972 | Columbini et al. ................... 423/87 |
| 3,911,078 | 10/1975 | Nadkarni et al. ..................... 423/87 |

FOREIGN PATENT DOCUMENTS

| 1161432 | 1/1964 | Fed. Rep. of Germany ............. 423/87 |
| 2714262 | 3/1978 | Fed. Rep. of Germany ............. 423/87 |

*Primary Examiner*—O. R. Vertiz
*Assistant Examiner*—Gary P. Straub
*Attorney, Agent, or Firm*—Toren, McGeady and Stanger

[57] ABSTRACT

A method of removal of arsenic from an acidic solution, in which ferrous ions contained in the solution are oxidized in the presence of high pressured oxygen and sulfuric acid to ferric ions, the solution with said ferric ions being mixed with the solution which has not subjected to oxidation, and the mixture of said solutions being controlled of its pH whereby ferric hydroxide is precipitated, which coprecipitates and adsorbs arsenic thereto.

2 Claims, 1 Drawing Figure

| | T (C°) | $P_{O_2}$ (kg/cm²) | amount of sulfuric acid |
|---|---|---|---|
| ○ | 60 | 20.0 | 1 equivalent |
| ● | 60 | 6.0 | 0.5 equivalent |
| △ | 80 | 1.5 | 1 equivalent |
| ▲ | 40 | 5.0 | 1 equivalent |

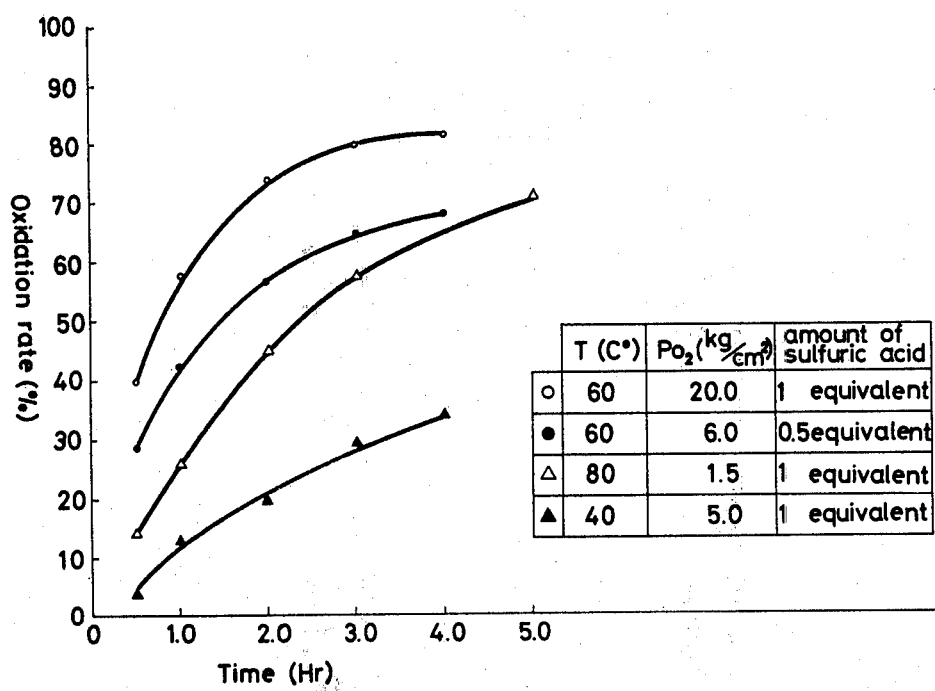

METHOD OF REMOVAL OF ARSENIC FROM A SULFURIC ACID SOLUTION

This invention relates to the separation and removal of arsenic from sulfated or sulfuric acid solution containing arsenic and heavy metals other than arsenic.

Arsenic and arsenic compounds are extremely poisonous and adversely affect human bodies, and when they remain in metals for industrial materials even in a small amount, they lower or deteriorate properties of such metals and adversely affect qualities of the materials.

As non-ferrous metal ores are usually obtained with arsenic contained therein, arsenic is extracted also when said ores are subjected to refinement for extracting non-ferrous metals from the ores, and remains within the metals. Hence, arsenic which is extracted in refinement, has to be removed from the objective metals. The removal of arsenic is extremely troublesome, and difficult.

Methods of extraction of metals from non-ferrous metal ores are generally classified to hydrometallurgy and pyrometallurgy. In hydrometallurgy, leaching is made commonly by sulfuric acid, and in pyrometallurgy also in which metals are collected in a molten state, the collection of metals from scattered dust is made by means of leaching by sulfuric acid. In these cases, arsenic is leached by sulfuric acid together with other metals, and when the metals are collected from a decoction, arsenic often mingles to the metals and comes out therwith from the decoction. While forms of the arsenic differ in accordance with extraction conditions of non-ferrous metals, its ionic valence is $As^{3+}$ or $As^{5+}$.

Arsenic can produce iron arsenate and potassium arsenate as hard-soluble acids, but can not make hard-soluble hydroxides. However, it is difficult to produce directly from arsenic in course of hydrometallurgy such hard-soluble acids, because a reaction for producing iron arsenate or potassium arsenate by arsenic is competive with a reaction by iron or potassium to produce whether or not they produce hydroxides or their arsenates.

As other metallurgical methods, there are an ion exchange method, adsorption method, sulfide precipitation method, and metal hydroxide coprecipitation and adsorption method. Among these methods, the ion exchange method and the method employing adsorption agents are scarecely employing since they are expensive to operate the methods. The method most favorite to industries is the method for the removal of arsenic by its coprecipitation and/or adsorption with metallic hydroxides, this hydroxides being commonly those with iron. In this method, the removal of $As^{3+}$ is harder than that of $As^{5+}$, and this trend becomes more so when their pH is comparatively low. And, when a temperature of the solution employed in the method is higher, an yield of the removal becomes lowerer. Hence, it is very difficult though not impossible to remove arsenic from sulfated or sulfuric acid solution containing arsenic by means of producing iron hydroxide by conventional methods. They need the production of a lot of iron hydroxide, and in addition, iron hydroxide can hardly be filtered, whereby the removal of arsenic with iron hydroxide by filtration thereof becomes industrially disadvantageous.

The removal of arsenic in accordance with this invention also includes ultimately the production of ferric hydroxide, and its coprecipitation and/or adsorption of arsenic. It differs from the aforementioned conventional methods in the points that the filtration efficiency of ferric hydroxide with arsenic is better than the conventional methods, the amount of iron for the adsorption of arsenic is lessen compared to the conventional methods, arsenic either in the form of $As^{5+}$ or $As^{3+}$ can effectively be removed, and that sulfated or sulfuric acid solution of comparatively high temperature can be treated. The present invention method can be adaptable to hydrometallurgy for the production of non-ferrous metals as well as the removal of arsenic from a waste liquid containing arsenic in order to the prevention of pollution.

Hereinafter, the method made in accordance with this invention is described further in detail.

A part of sulfated or sulfuric acid solution containing arsenic and at least ferrous ion (hereinafter described as $Fe^{2+}$) is transferred into a pressure chamber in which $Fe^{2+}$ is oxidized to ferric ion (hereinafter described as $Fe^{3+}$) in the presence of oxygen, the part of solution thus oxidized and the remnant of solution not treated by oxidation are mixed at a specific ratio, the mexture is controlled of its pH by the addition of alkaline agents so as to produce iron hydroxide, and said hydroxide compounds are separated from the solution by filtration so as to remove arsenic therewith.

The oxidation reaction of $Fe^{2+}$ in the sulfuric acid solution is represented by the following equation in which 1 mol of sulfuric acid is required for 2 moles of ferrous sulfate.

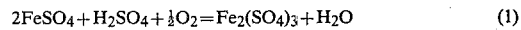

$$2FeSO_4 + H_2SO_4 + \tfrac{1}{2}O_2 = Fe_2(SO_4)_3 + H_2O \qquad (1)$$

In the non-existence of sulfuric acid, reaction in accordance with the following equation proceeds.

$$2FeSO_4 + 3H_2O + \tfrac{1}{2}O_2 = 2FeOOH + 2H_2SO_4 \qquad (2)$$

To wit, in the equation (2) hydrolysis of ferrous sulfate is made, whereby geothite is produced first, which in turn produces sulfuric acid as a by-product thereof, and the reaction in accordance with the equation (1) proceeds then. In this case, as an oxidation speed is not so fast, it shall be needed to preliminarily ascertain an amount of sulfuric acid existing in a solution to be subjected to the oxidation.

There are several methods for the oxidation, viz., agitation of a solution with air, utilization of bacteria, and employment of NO catalysts. The oxidation by the agitation of air proceeds slow, and is therefore not practical. Compared to the oxidation by bacteria in which a solution of pH of about 2.5 is most effectively oxidized, the present invention is most advantageously and economically employable throughout the processes of the invention, when a concentration of $Fe^{3+}$ in the solution subjected to the oxidation is higher. In case of a solution being of pH 2.5, $Fe^{3+}$ concentration in the solution is theoretically about 0.12 g/l (calculated Kso of $Fe(OH)_3$ being $6.93 \times 10^{-38}$). As an excess amount of $Fe^{3+}$ is hydrolyzed and precipitates as ferric hydroxide or basic iron sulfate, the amount of $Fe^{3+}$ becomes insufficient when the oxidized solution is mixed with an untreated solution for the removal of arsenic. Hence, the utilization of bacteria is not preferable. While the employment of NO catalysts is quick in its oxidation and it is economical since air is utilized, nitric radicals $NO_3^-$ which are produced by the oxidation of a part of NO, corrode apparatuses. In addition, when metals are to be individually collected from a solution containing heavy metals in accordance with this invention, said $NO_3^-$ disturbes the collection of heavy metals, and deteriorates quality thereof. Further in addition, NO which is escaped into the air shall be a cause for producing oxidant. The addition of NO catalyst is not preferable at any rate on the above reasons.

In this invention, the oxidation of $Fe^{2+}$ is made by industrial oxygen which is introduced under pressure into a chamber. The oxidation under pressure within a pressure chamber has a high reaction velocity, does not adversely affect steps for collecting metals, and is free from pollution.

Any kind of conventional pressure chamber can be employed in this invention, if it assures good contacts between the oxygen and the solution contained in the chamber. For example, in the experiments of this invention, an autoclave provided with upper and lower propellor-type agitation blades, was used. The blades were rotated at 700–1,000 rpm, whereby good contacts between oxygen and the solution were obtained.

As $H_2SO_4$ is required for the oxidation of $Fe^{2+}$ as shown in the aforementioned formula (1), $H_2SO_4$ has to be added to a sulfated solution, if it does not contain $H_2SO_4$ in an amount equivalent to or more than the amount of $Fe^{2+}$. The amount of $H_2SO_4$ is preferably at least 0.2 equivalent of the amount of $Fe^{2+}$ or more than that. In this connection, an amount of neutralization agents which are to be added to the solution for producing ferric hydrate, is to be considered. It has to be considered also that pH of the solution which has been oxidized shall not bring about the hydrolysis of $Fe^{3+}$.

It shall be noted that oxidation speeds of a solution in accordance with this invention are proportional with reaction temperatures and pressures of oxygen. This relation is shown in the accompanying drawing.

Mixing ratios of the oxidized solution and the untreated remnant of solution are important for carrying out the removal of arsenic economically, and are different in accordance with concentrations of residual arsenic one expects in the solution after the treatment. In general, the amount of $Fe^{3+}$ which is required to remove arsenic, is larger in case of the arsenic being $As^{3+}$ than $As^{5+}$. In case of $As^{3+}$, the required ratio of Fe/As in weight is about 50. When an extremely high removal of arsenic is aimed, said ratio would be about 100–150.

Whereas, in this invention, a weight ratio of Fe/As which is required to make a concentration of residual arsenic lower than 0.05 g/l, is only about 6–8, and said ratio for making said concentration to $0.00 \times$ g/l is 10–40, whereby the amount of iron which precipitates as ferric hydrate, could be make minimum. Therefore, it can be said that the amount of $Fe^{3+}$ is such that $Fe^{3+}$ in a mixture solution becomes more than two times of the total amount of arsenic in the mixture solution. The mixing ratio of an oxidized solution and an untreated solution can easily be decided by means of a ratio of $Fe^{3+}$ in the oxidized solution to arsenic. For example, when arsenic in a starting solution is 0.5 g/l and a weight ratio of Fe/As was made as 8, 4 g of $Fe^{3+}$ is required per 1 liter of the starting solution. If $Fe^{3+}$ in the oxidized solution is 10 g/l, 1 liter of the oxidized solution can remove arsenic contained in 2.5 liter of the mixture solution. Therefore, the ratio between the oxidized solution and the untreated solution is 1:1.5. When $Fe^{3+}$ concentration in the oxidized solution is higher a mixing ratio of the oxidized and untreated solutions can be larger, resulting in making the process more economical.

In a step of this invention method, in which arsenic is removed by its coprecipitation with and adsorption by those precipitates which are produced by the control of pH of the mixture solution, said control is made by the addition of alkali agents such as ammonia, caustic soda, calcium hydroxide, calcium carbonate, and so on. While the pH for starting the production of iron hydroxide differs in accordance with a concentration of iron, pH for producing hydroxide of $Fe^{3+}$ is about 2.2, and that for hydroxide of $Fe^{2+}$ is about 7.7. When heavy metals such as copper and zinc are to be removed from a sulfuric acid solution, in addition to arsenic, pH 6.0 for producing hydroxide of copper and pH 6.8 for producing hydroxide of zinc are to be taken into consideration. And, it shall be noted that pHs for actually producing the above hydroxides are commonly a little acidic. In view of the above, the maximum pH adaptable in this invention is that for producing hydroxide of a metal one wishes to collect from the solution, while said pH can not be made as high as for producing hydroxide of $Fe^{2+}$. Various experiments made in accordance with this invention show that the pH suitable for removing $As^{3+}$ which is one of features of this invention, is 3.5–4.6, and preferably 3.9–4.6.

In conventional methods in which arsenic is coprecipitated with or adsorbed by iron hydroxide, the removal of $As^{3+}$ is harder when compared to that of $As^{5+}$, and the pH required for effectively removing arsenic is 3–8 in case of $As^{5+}$ and 6–8 in case of $As^{3+}$. And, as described in the above, in these conventional methods, the amount of $Fe^{3+}$ required to the removal of $As^{3+}$ is about 50 weight ratio, and that for more fine removal thereof is as much as 100–150. Further, it shall be noted that in the conventional methods, when a temperature of the solution is high, coprecipitation and adsorption efficiencies are lowered about 20%, when compared to a solution of a room temperature.

Whereas, as described in the above and as examplified in the following examples, it is one of advantages of this invention that a range of pH for collecting arsenic which is in the form of $As^{3+}$, is as low as 3.5–4.6 which value is comparable to that for collecting $As^{5+}$. This fact has further advantageous points that the amount of neuralization agents can be minimized, and that when specific heavy metals are to be collected, the production of hydroxide of other metals can easily be avoided, whereby an yield of said specific heavy metals is improved.

With respect to a weight ratio of Fe/As, this invention has another advantage that by said ratio being only about 6, 90% of arsenic is removable, and more than 98% of arsenic can be removed when said ratio is 10–40. This means that the amount of coprecipitation of iron could be about $\frac{1}{3}$–$\frac{1}{8}$ of that of conventional methods.

In addition, as the method of this invention is not largely affected by a temperature of solution, the lowering of yield at a high temperature of 60° C. is only 10% less than that, when compared to that conducted at a room temperature.

EXAMPLE 1.

A solution solved with ferrous hydrate ($FeSO_4 \cdot 7H_2O$), arsenic trioxide ($As_2O_3$) and copper sulfate (Cu- SO$_4$.5H$_2$O) contained a iron concentration of 63.13 g/l, arsenic concentration of 0.42 g/l, and copper concentration of 2.94 g/l. To 1 liter of said solution, there was added sulfuric acid of an amount equivalent to the amount of Fe$^{2+}$ in the solution. The solution then transferred into an autoclave of a capacity of 2 liter was subjected to oxidation for 5 hours with the conditions that temperature was 60° C., oxygen pressure 20 Kg/cmG, agitation velocity 700 rpm. Fe$^{3+}$ concentration of the solution thus oxidized was 55.50 g/l, and its pH was 1.2.

Said oxidized solution was mixed with an untreated solution at different ratios, viz., 1:10, 1:5, 3:10, 1:2, and added by Ca(OH)$_2$ until its pH became 4.3 while stirring it at a room temperature. This operation was kept for 30 minutes, and then the solution and precipitates therein were separated by means of a Büchner funnel.

Following Table 1 shows arsenic residues in the solution, rates of removal of arsenic, ratios of Fe/As, and rates of residual copper.

TABLE 1

| Mixing ratios | Arsenic residues in the solution (g/l) | Rates of removal of arsenic (%) | Fe/As (weight ratio) | Rates of residual copper (%) |
| --- | --- | --- | --- | --- |
| 1:10 | 0.006 | 98.5 | 9.6 | 100 |
| 1:5 | 0.004 | 99.0 | 18.2 | 100 |
| 3:10 | 0.003 | 99.3 | 29.5 | 100 |
| 1:2 | 0.001 | 99.7 | 34.6 | 100 |

EXAMPLE 2

Another solution solved with ferrous hydrate (FeSO$_4$.7H$_2$O), arsenic trioxide (As$_2$O$_3$) and zinc sulfate (ZnSO$_4$.7H$_2$O) contained an iron concentration of 45.07 g/l, arsenic concentration of 0.43 g/l, and zinc concentration of 64.36 g/l. To 1 liter of this solution, there was added sulfuric acid of an amount equivalent to Fe in the solution, and then, it was contained in an autoclave of a capacity of 2 liter. The autoclave was heated to 80° C. and kept under a pressure of 1.5 Kg/cm$^2$G by means of industrial oxygen. The solution was kept in the autoclave for 2 hours, while it was agitated at 1,000 rpm. The Fe$^{3+}$ concentration in the solution thus treated was 21.23 g/l, and its pH was 1.1.

This solution and an untreated solution were mixed at ratios of 1:40, 1:20, 3:40, and 1:10. The solutions thus mixed were kept at 60° C., and added by Ca(OH)$_2$ so as to make their pHs 4.5. The solutions were kept for 30 minutes as they were. The solutions were separated from precipitates in the solutions, by means of a Büchner funnel. Arsenic residues in the solutions, rates of removal of arsenic from the solutions, Fe/As rates, and rates of residual zinc in the solutions are given in the following Table 2.

TABLE 2

| Mixing ratios | Arsenic residues in the solution (g/l) | Rates of removal of arsenic (%) | Fe/As (weight ratio) | Rates of residual zinc (%) |
| --- | --- | --- | --- | --- |
| 1:40 | 0.18 | 61.4 | 3.4 | 100 |
| 1:20 | 0.11 | 77.6 | 4.1 | 100 |
| 3:40 | 0.07 | 85.6 | 5.3 | 100 |
| 1:10 | 0.04 | 91.8 | 6.4 | 100 |

EXAMPLE 3

A further another solution consisting of ferrous hydrate (FeSO$_4$.7H$_2$O), arsenic trioxide (As$_2$O$_3$) and sulfuric acid (H$_2$SO$_4$) contained an iron concentration of 47.86 g/l, arsenic concentration of 1.46 g/l, and a concentration of sulfuric acid of 23.57 g/l. To 1 liter of this solution, there was added 20 g of sulfuric acid, and then it was poured into an autoclave of a capacity of 2 liter. The autoclave was heated to 60° C., and kept by industrial oxygen at a pressure of 6 Kg/cm$^2$G. A concentration of Fe$^{3+}$ in the solution was 32.07 g/l, after it was agitated at 900 rpm and for 4 hours.

The solution thus treated with mixed with an untreated solution at ratios of 1:2, 1:1, and 1:0.5. The mixtures were added by calcium carbonate (CaCO$_3$) until they reached pH 4.1, while they were agitated at a room temperature for 60 minutes. The mixtures were separated from their precipitates by a Büchner funnel.

Arsenic residues in the mixture solutions, rates of removal of arsenic from the solutions, and Fe/As rates are given in the following Table 3.

TABLE 3

| Mixing ratios | Arsenic residues in the solution (g/l) | Rates of removal of arsenic (%) | Fe/As (weight ratio) |
| --- | --- | --- | --- |
| 1 : 2 | 0.04 | 97.3 | 6.7 |
| 1 : 1 | 0.01 | 99.3 | 10.0 |
| 1 : 0.5 | 0.007 | 99.5 | 14.1 |

What is claimed is:

1. A method of removal of As$^{3+}$ from a sulfuric acid solution containing arsenic and ferrous ions which comprises:
   (a) subjecting a part of said solution to oxygen under pressure so as to oxidize said ferrous ions to ferric ions;
   (b) mixing the oxidized solution with the remainder of the solution under agitation in amounts such that the weight ratio of Fe$^{3+}$/As$^{3+}$ in the mixture is between about 2 and 40;
   (c) adjusting the pH of the mixture from step (b) to 3.5 to 4.6 to produce a precipitate which coprecipitates or adsorbs arsenic; and
   (d) separating and removing the precipitates from the mixture.

2. The method of claim 1 in which sulfuric acid is added to the solution in step (a) in an amount sufficient to prevent the precipitation of ferric hydroxide during the oxidation.

* * * * *